United States Patent [19]
Chen

[11] Patent Number: 6,016,263
[45] Date of Patent: Jan. 18, 2000

[54] STORAGE DEVICE DESIGNED FOR USE WITH PC SYSTEM AND FORMED OF RAM MODULE

[76] Inventor: Hui-Ju Chen, No. 5-27, Chung She Road, Ching Shui Chen, Taichung Hsien, Taiwan

[21] Appl. No.: 09/333,982

[22] Filed: Jun. 16, 1999

[51] Int. Cl.[7] ................................................. H01L 27/108
[52] U.S. Cl. .................. 365/51; 365/230.01; 365/230.03
[58] Field of Search .......................... 365/230.03, 189.01, 365/230.01, 63, 51; 711/105, 118

[56] References Cited

U.S. PATENT DOCUMENTS

| | | | |
|---|---|---|---|
| 5,860,025 | 1/1999 | Roberts et al. | 365/230.03 |
| 5,923,829 | 7/1999 | Ishii et al. | 711/105 |

*Primary Examiner*—Vu A. Le
*Attorney, Agent, or Firm*—Browdy and Neimark

[57] ABSTRACT

A storage device is designed for use with a personal computer system and formed of a RAM module connected with a power unit, and a memory accessing unit which is intended to access data in the RAM module and is connected with a data accessing interface serving as a data accessing interface between the storage device and the personal computer system. The memory accessing unit and the data accessing interface are connected with a command translating unit which is intended to translate a control machine code of the hard disk of the personal computer system into a control machine code of the memory accessing unit. The booting of the personal computer system and the executing of application programs by the personal computer system are accelerated by the storage device.

9 Claims, 3 Drawing Sheets

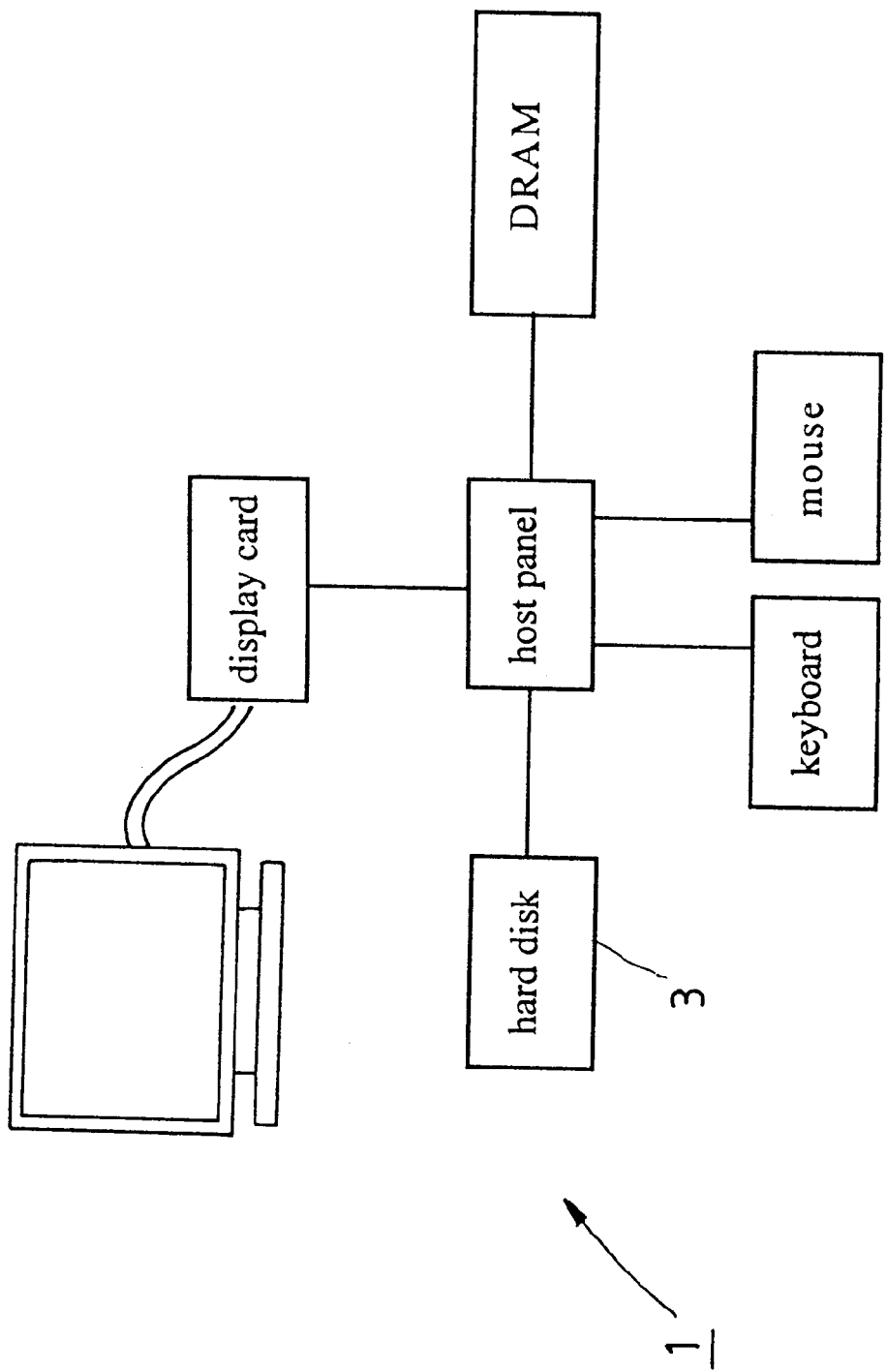
F I G. 1

6,016,263

STORAGE DEVICE DESIGNED FOR USE WITH PC SYSTEM AND FORMED OF RAM MODULE

FIELD OF THE INVENTION

The present invention relates generally to a storage device for use with a computer system, and more particularly to a storage device which is intended for use with a personal computer system and is formed of a random access memory module.

BACKGROUND OF THE INVENTION

Since the evolution of personal computer from Apple II, IBM personal computer, and Apple Machintosh, the personal computer has become an indispensable management tool in offices, schools, hospital, factories, amusement facilities, etc. As shown in FIG. 1, a computer system 1, which is currently available in the market place, is provided with a PC or Machintosh, which depends on a floppy disk (not shown in the drawing) or hard disk 3 to boot the system and to access data. There are currently a few computer systems which make use of CD-ROM to boot the systems. In light of the hard disk being faster than the floppy disk or CD-ROM in booting the computer system, the user of the computer system understandably prefers to boot the system with the hard disk 3. Such a conventional system as described above has drawbacks, which are described hereinafter.

As far as the booting of a computer system is concerned, let's take an example of the computer operating system which is provided with the Microsoft Windows 98 matching Intel Pentium II 300. It takes about one minute from the power start-up to the boot. However, it takes much longer to complete the booting of the compute system in the event that other application programs, such as anti-virus program, etc., are loaded at the time of the boot, thereby resulting in a great deal of inconvenience, waste of time, and even annoyance to the system users.

In the process of executing an application program by the conventional computer system, the data and the program codes needed by the application program are loaded into the memory from the hard disk to facilitate the executing of the program by the central processing unit. Take Microsoft Office application program as an example. The software takes up a great deal of space in the memory, thereby resulting in a substantially time-consuming booting. In the event that the memory is not large enough, the hard disk makes use of a virtual memory to supplement the physical memory while the large program is being executed, at the expense of the speed at which the data are transmitted by the hard disk.

SUMMARY OF THE INVENTION

It is therefore the primary objective of the present invention to provide a storage device which is designed for use with a personal computer system and is formed of a random access memory module for reducing the time that is needed to complete the booting of the PC system.

It is another objective of the present invention to provide a storage device which is intended for use with a personal computer system and is formed of a RAM module for speeding up the booting and the execution of the application program.

The storage device of the present invention comprises at least a RAM module, a memory accessing unit, a data accessing interface, a command translating unit, and a power unit. The memory accessing unit is connected with the RAM module for storing the data in a predetermined address in the RAM module and for retrieving the data stored in the predetermined address in the RAM module. The data accessing interface is compatible with the PC hard disk accessing interface and is connected with the memory accessing unit for transmitting the data stored in the RAM module to the PC system via the memory accessing unit, and for attending to the input of data that are to be stored in the predetermined address in the RAM module. The command translating unit is connected with the data accessing interface and the memory accessing unit for translating the code for controlling the hard disk into the code for controlling the memory accessing unit, and for accessing the data of the RAM module, so as to bring about the action similar to the accessing data of the hard disk. The power unit is connected with the RAM module for providing power to the RAM module for maintaining the data storage in the RAM module. The operation system or application program of the PC system are kept in the storage device to accelerate the booting of the PC system as well as the execution of the application program.

The foregoing objectives, features and functions of the present invention will be more readily understood upon a thoughtful deliberation of the following detailed description of a preferred embodiment of the present invention with reference to the accompanying drawings.

BRIEF DESCRIPTION OF THE DRAWINGS

FIG. 1 shows a block diagram of the conventional computer system.

DETAILED DESCRIPTION OF THE INVENTION

Figure 2:
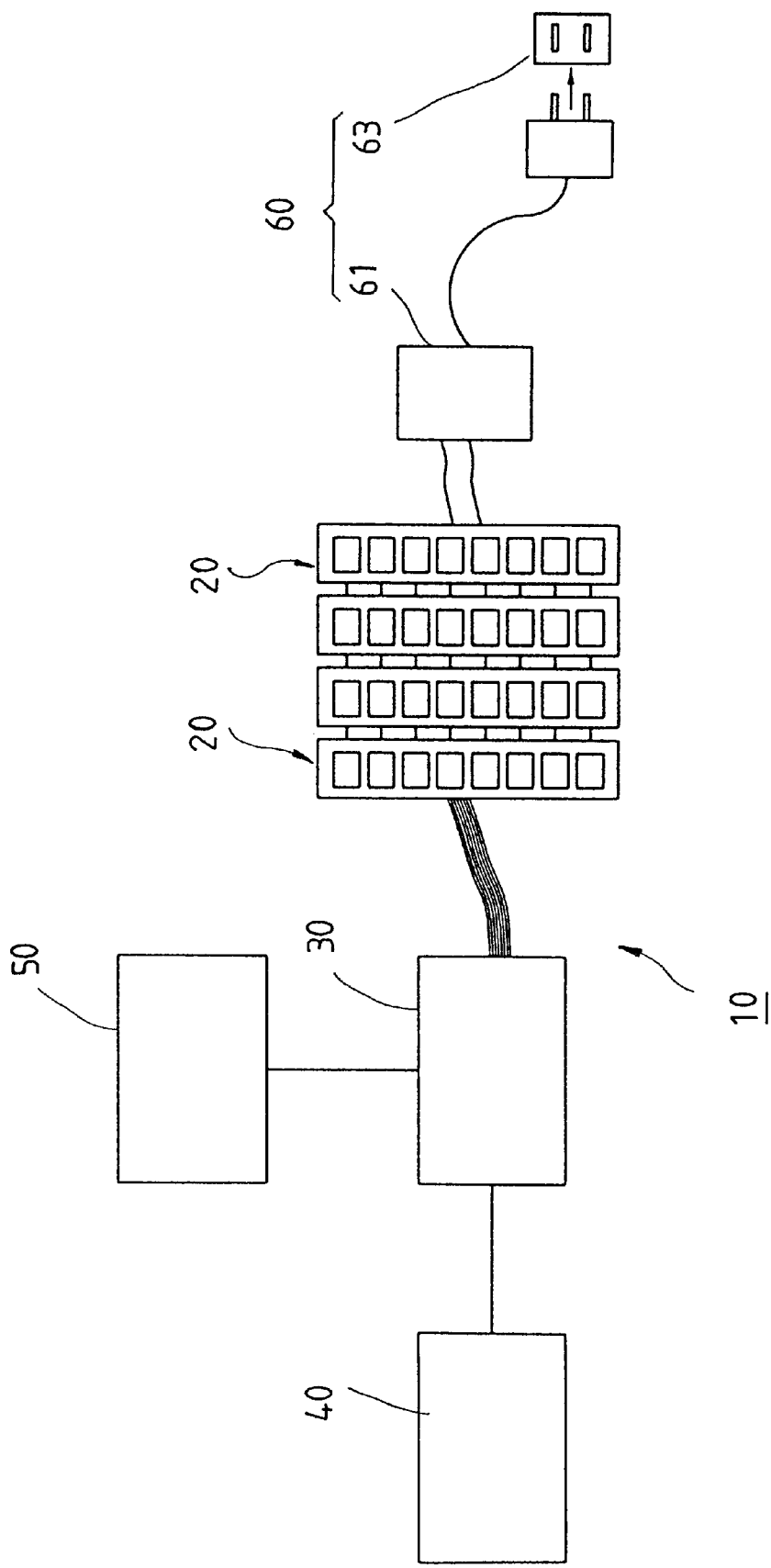
FIG. 2 shows a block diagram of the preferred embodiment of the present invention.
Figure 3:
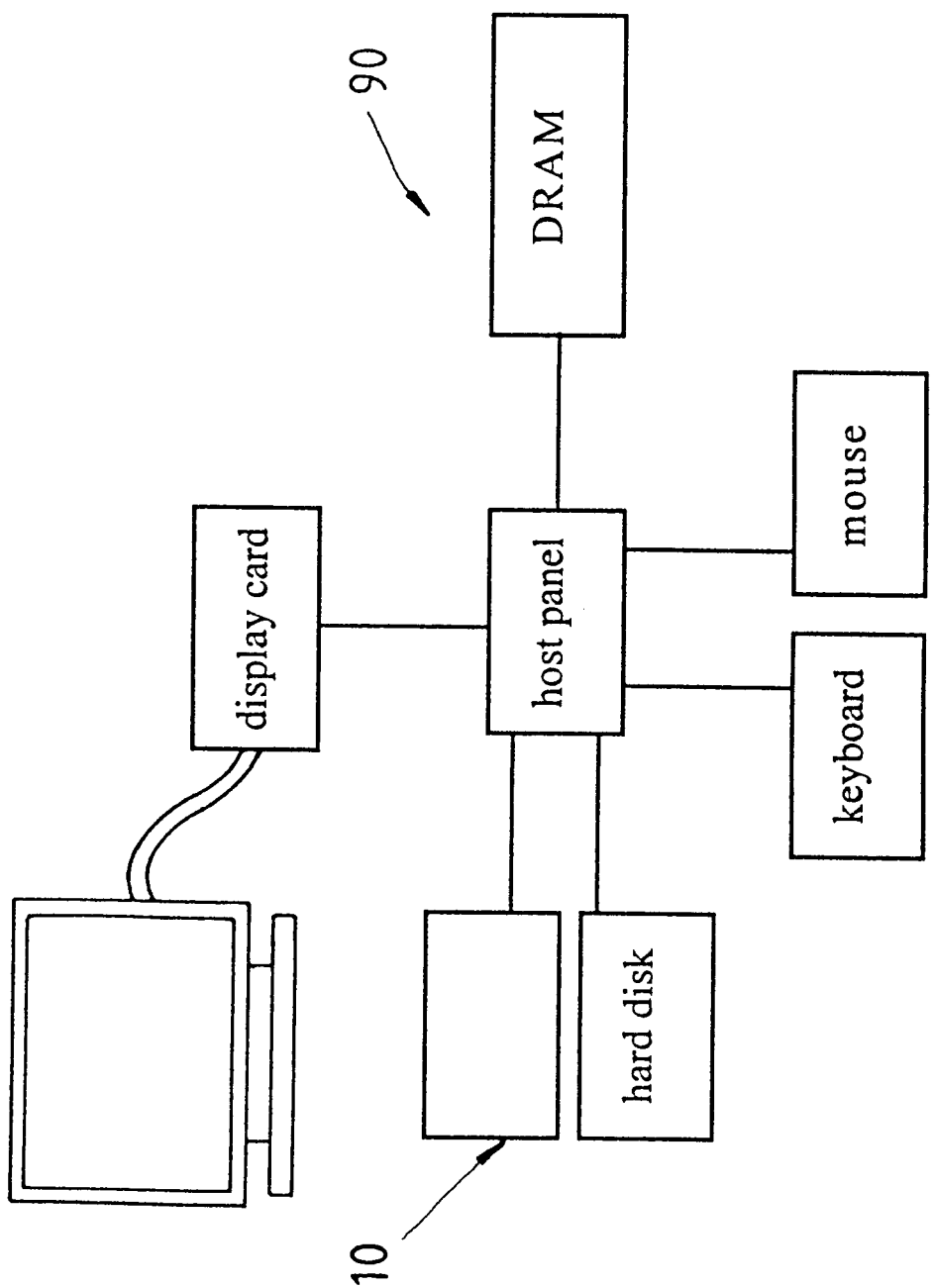
FIG. 3 shows a block diagram of the present invention in use with a PC system.

As shown in FIGS. 2 and 3, a storage device 10 of the preferred embodiment of the present invention is designed for use with a PC system 90 and is formed of a plurality of RAM modules 20, a memory accessing unit 30, a data accessing interface 40, a command translating unit 50, and a power unit 60.

The RAM modules 20 of the preferred embodiment of the present invention are dynamic random access memory (DRAM) modules 20, which are interconnected and provided with storage space of a predetermined capacity, such as 640 MB of the preferred embodiment of the present invention.

The memory accessing unit 30 is connected with the DRAM modules 20 for loading the data into a predetermined address of the storage space formed in the DRAM modules 20 and for retrieving the data from the address of the storage space of the DRAM modules 20.

The data accessing interface 40 of the preferred embodiment of the present invention is compatible with IDE hard disk interface for use with a PC system and is connected with the memory accessing unit 30. Through the control of the memory accessing unit 30, the data stored in the DRAM modules 20 are transmitted via the IDE hard disk interface of the computer system to the PC system 90, as shown in FIG. 3. In addition, through the control of the memory accessing unit 30, the data transmitted into the PC system 90 via the IDE interface are stored in a predetermined address of the DRAM modules 20.

The command translating unit 50 is connected with the memory accessing unit 30 for translating the control machine code of the hard disk into the control machine code of the memory accessing unit 30, so as to store the data in the DRAM modules 20 or to retrieve the data from the DRAM modules 20.

The power unit 60 has a storage battery 61 capable of being charged repeatedly, and an externally-connected city power source 63 which is connected with the storage battery 61. The storage battery 61 is connected with the DRAM modules 20 for providing the DRAM modules 20 with a continuous supply of power so as to enable a continuous storage of data in the DRAM modules 20. The storage battery 61 is recharged by the city power source 63.

As shown in FIG. 3, the storage device 10 is mounted on a personal computer such that the data accessing interface 40 is connected with the IDE interface of the computer system by gang line (not shown in the drawing), and that the power unit 60 is connected with an electrical outlet (not shown in the drawing).

In operation, the storage device 10 of the present invention is operated in a way similar to the conventional method for operating a hard disk. The data are not yet stored in the storage space formed in the DRAM modules 20. The operator may input Fdisk, format, save, delete, etc. In the meantime, the operating system, such as Windows 98, is mounted in the storage device 10 such that the operating command of the operator is translated by the command translating unit 50 into the control machine code relative to the memory accessing unit 30, thereby resulting in the data being stored in and retrieved from the DRAM modules 20.

The data accessing interface of the present invention may be an SCSI interface of the hard disk of a personal computer.

The power unit of the present invention may have only one storage battery, which is connected with a power supplying device of the computer system. The power unit of the present invention may be connected with a transforming circuit of the household alternating current.

The storage space of the present invention is not confined to 640MB, as long as the storage space is sufficient for the operating system.

The storage device of the present invention may be used with a computer system in conjunction with a hard disk. Take the IDE interface as an example. The storage device of the present invention is set as MASTER, whereas the hard disk is set as SLAVE.

The random access memory module of the present invention is not confined to DRAM and may be a memory of other specification, such as SDRAM.

A storage device of a second preferred embodiment of the present invention is basically similar to that of the first preferred embodiment described above, with the difference being that the former is devoid of the power unit, and that the power source of the former comes from the power supply of the computer system.

The present invention has advantages, which are described hereinafter.

The present invention reduces the time that one has to wait for the computer system to be in operating condition after the computer is booted. In light of the storage device of the present invention being formed of at least one RAM module, the data accessing speed of the present invention ranges between 60 and 70 ns, which is much faster than the data accessing speed (9–10 ms) of the hard disk.

The present invention enables the computer system to execute an application program rapidly in view of the fact that the data accessing speed of the storage device of the present invention is faster than that of the hard disk. The high-speed execution of the application program will not be adversely affected by the inadequate memory space of the computer system, thanks to the virtual memory of the present invention for supplementing the physical memory.

The embodiments of the present invention described above are to be regarded in all respects as being merely illustrative, and not restrictive. Accordingly, the present invention may be embodied in other specific forms without deviating from the spirit thereof. The present invention is therefore to be limited only by the scopes of the following appended claims.

What is claimed is:

1. A storage device designed for use with a personal computer system and formed of one or more RAM modules, said storage device comprising:

at least one RAM module;

a memory accessing unit connected with said RAM module for storing data in a predetermined address in said RAM module, or retrieving data from a predetermined address in said RAM module;

a data accessing interface compatible with a hard disk accessing interface of the personal computer and connected with said memory accessing unit so as to output data stored in said RAM module to the personal computer system through control of said memory accessing unit, and to input data of the computer system to a predetermined address in said RAM module through control of said memory accessing unit;

a command translating unit connected with said memory accessing unit and said data accessing interface for translating a control machine code of the hard disk of the personal computer system into a control machine code of said memory accessing unit; and a power unit connected with said RAM module for providing said RAM module with a continuous supply of power enabling a continuous storage of the data in said RAM module;

said storage device storing an operating system or application program, which is quickly executed through said RAM module having an accessing speed faster than that of the hard disk.

2. The storage device as defined in claim 1, wherein said RAM module has a total capacity equal to a total capacity of a computer loaded with an operating system.

3. The storage device as defined in claim 1, wherein said data accessing interface is compatible with an IDE interface for use with the personal computer system and is connected with the IDE hard disk interface of the personal computer system.

4. The storage device as defined in claim 1, wherein said data accessing interface is compatible with an SCSI interface for use with the personal computer system and is connected with the SCSI hard disk interface of the personal computer system.

5. The storage device as defined in claim 1, wherein said power unit comprises a rechargeable storage battery.

6. The storage device as defined in claim 5, wherein said power unit further comprises an externally-connected city power source which is connected with said storage battery for recharging said storage battery.

7. The storage device as defined in claim 1, wherein said power unit is connected with a transforming circuit of an alternating current source.

8. A storage device designed for use with a personal computer system and formed of one or more RAM modules, said storage device comprising:

at least one RAM module;

a memory accessing unit connected with said RAM module for storing data in a predetermined address in said RAM module, or retrieving data from a predetermined address in said RAM module;

a data accessing interface compatible with a hard disk accessing interface of the personal computer and connected with said memory accessing unit so as to output data stored in said RAM module to the personal computer system through control of said memory accessing unit, and to input data of the computer system to a predetermined address in said RAM module through control of said memory accessing unit; and a command translating unit connected with said memory accessing unit and said data accessing interface for translating a control machine code of the hard disk of the personal computer system into a control machine code of said memory accessing unit;

said storage device storing an operating system or application program, which is quickly executed through said RAM module having an accessing speed faster than that of the hard disk.

9. The storage device as defined in claim 8, wherein said RAM module is connected with one storage battery, which is connected with a power supply of the personal computer system.

* * * * *